Aug. 18, 1936. D. G. SMELLIE Re. 20,073

SUCTION CLEANER AGITATOR

Original Filed July 19, 1929 2 Sheets-Sheet 1

Witness
R. B. Davis

Inventor
Donald G. Smellie
By H. S. Edwards
Atty.

Aug. 18, 1936. D. G. SMELLIE Re. 20,073

SUCTION CLEANER AGITATOR

Original Filed July 19, 1929 2 Sheets-Sheet 2

Witness
R. B. Davison

Inventor
Donald G. Smellie
By H. S. Dimarez
Attys

Reissued Aug. 18, 1936

Re. 20,073

UNITED STATES PATENT OFFICE 20,073

SUCTION CLEANER AGITATOR

Donald G. Smellie, Canton, Ohio, assignor to The Hoover Company, a corporation of Ohio Original No. 1,942,497, dated January 9, 1934, Serial No. 379,412, July 19, 1929. Application for reissue November 30, 1934, Serial No. 755,444

15 Claims. (Cl. 15—183)

The present invention relates to suction cleaners and more particularly to rotary agitating members for suction cleaners. The invention is directed particularly to that improvement in the construction of rotary agitating members for suction cleaners wherein the length of bristles projecting from the body of said agitator is made variable.

The object of the present invention is the provision of a new and improved suction cleaner agitator. A further object is the provision of an agitating member in which the brush members have longer life than in the usual suction cleaner rotor. A still further object is the provision of an improved suction cleaner rotor construction embodying adjusting means adapted to vary the effective length of the sweeping brushes. Another object is the provision of an improved rotary agitator construction in which the sweeping brushes are easily replaceable. Still another object of the invention is the provision of a rotary agitator for a suction cleaner in which the brushes are radially adjustable to compensate for wear, the effective bristle length for flexing remaining constant with constant radial projection of the brush regardless of the adjustment of the brush-adjusting means. Other and more specific objects will appear upon reading the specification and upon consideration of the drawings annexed thereto.

In the drawings in which like reference characters refer to like parts throughout:

Figure 1 discloses a rotary agitator constructed in accordance with the present invention with certain parts broken away.

Figure 7:
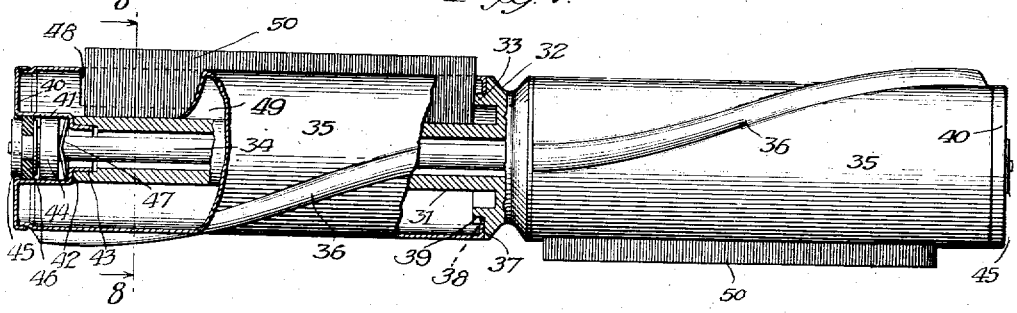

Figure 7 discloses a side elevation of a modification of the present invention with certain parts broken away.

Figure 8:
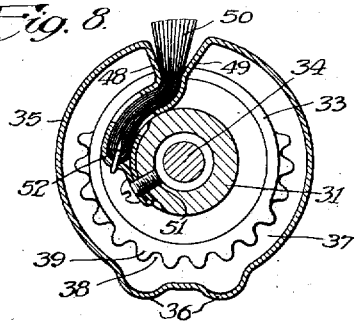

Figure 8 is a cross section upon the line 8—8 of Figure 7.

Figure 9:
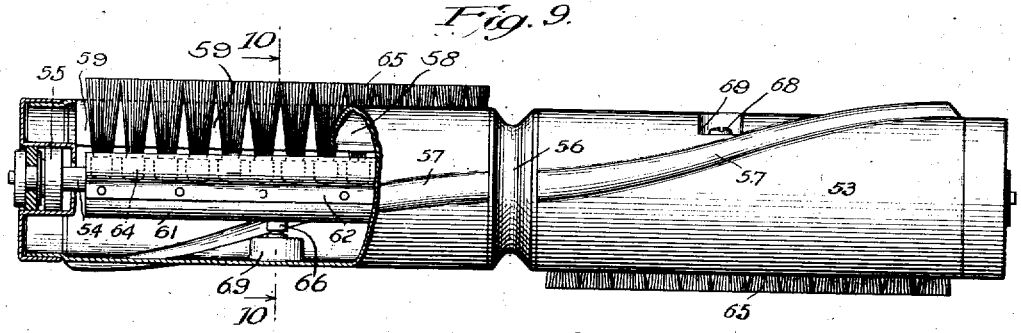
Figure 10:
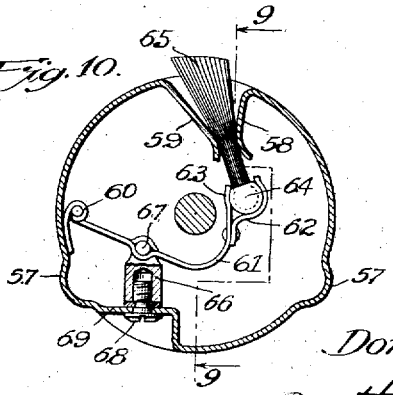

Figure 9 discloses a side elevation of a still further embodiment of the present invention with certain parts shown in section upon the line 9—9 of Figure 10.

Figure 10 is a cross section upon the line 10—10 of Figure 9.

Figure 1:
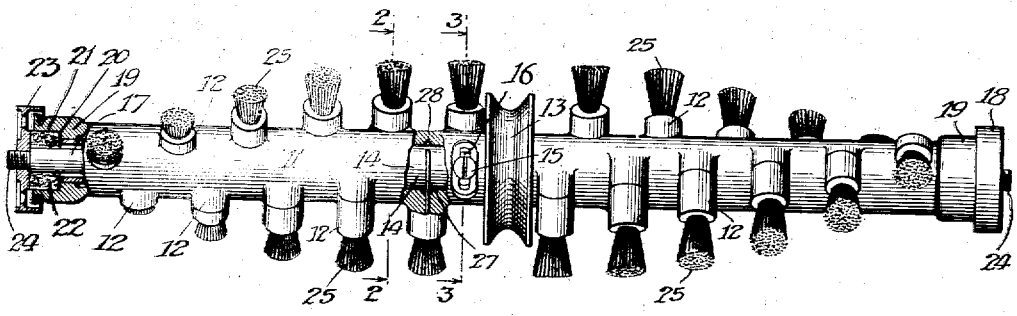

Referring now to Figure 1 in particular, an embodiment of the present invention is disclosed which comprises a hollow rotor body 11 which is provided with individual brush seats 12, 12 etc. which extend in helical rows in opposite directions around said body from end to end thereof; the individual seats of the rows being axially staggered relative to each other. Positioned approximately in the center of the body 11 is the belt-receiving pulley 13 adapted to receive a driving belt in the operation of the rotor in a suction cleaner to provide rotation.

Positioned within the body member 11 and extending substantially the length thereof is the tubular member 14 which is non-rotatably held relative to the body 11 by the screw 15 which extends through said body member into said tubular member 14 and which is adapted to be seated in a plurality of seats 16, 16 upon the surface of said body member. Positioned within the tubular member 14 and extending therethrough is a supporting rod 17. Body member 11 is provided near its respective ends with inwardly extending shoulders 19 which serve to support the ends of tubular member 14 and so maintain that member in axial alinement and which also provide the base 20 of the bearing seat 21. A bearing 22 of any suitable design is positioned within the seat 21 enclosing the end of the supporting member 17 in rotatable relation. A nut-member 23 is positioned on the threaded end 24 of member 17 and serves to secure bearing 22 in its seat 21. In the operation of the rotor in a suction cleaner the supporting member 17 is non-rotatably mounted and the rotor body 11 with the tubular body 14 rotate relative thereto upon the bearings 22, 22.

Figure 2:
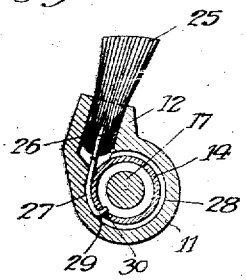
Figure 2 is a cross section upon the line 2—2 of Figure 1.
Figure 3:
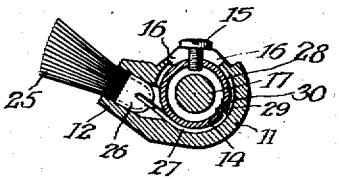
Figure 3 is a cross section upon the line 3—3 of Figure 1.
Figure 4:
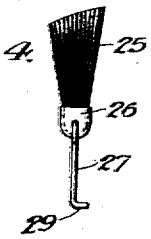
Figure 4 is a view in side elevation of a tuft of bristles and the securing means used in the embodiment shown in Figure 1.
Figure 5:
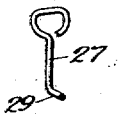
Figure 5 is a view in perspective of the securing and adjusting wire for the tuft of bristles shown in Figure 4.

Seated within each of the brush seats, 12, 12 of the rotor body 11 are tufts or bristles 25, 25, etc. each of which is locked within a cup member 26 by means of a securing wire 27 as shown in Figures 2 and 4. The wire 27 extends from the cup 26 through the seat 12 and into the body proper 11 of the rotor where it lies in a circular groove 28, such a groove being positioned in said body at the base of each tuft seat 12. Each wire 27 is provided with a bent end portion 29 which is securely seated within an opening 30 in the tubular member 14. The radial openings 30 in the tubular member 14 extend in spiral rows thereon having the same angle of advance as do the rows of brush tuft seats 12, 12, etc. upon the body 11 of the rotor.

In the use of the rotor in a suction cleaner the length of the brush bristles decreases with wear and it becomes necessary from time to time, in the ordinary agitating member, to replace the bristles. In the agitator constructed in accordance with the present invention, it is only necessary when it is desired to lengthen the bristles after their effective length has been shortened by wear, to loosen the screw 15, thereby disengaging it from one of the plurality of seats 16 on the body 11, and to rotate the tubular member 14 relative to body 11 by advancing screw 15 to a new seat. With the rotation of the tubular member 14 in a clockwise direction relative to the body member 11, as shown in Figure 2, it is clear that the wire 27 will be projected a greater distance into the brush seat 12 resulting in the increased projection of the tuft 25 therefrom. With bristles adjusted to the desired length through the rotation of the member 14 the screw 15 is tightened and the rotor is again ready for use. In the event that it is desired to decrease the effective length of the bristles it is only necessary to rotate the tubular member 14 in the counter-clockwise direction, as shown in Figure 2.

Figure 6:
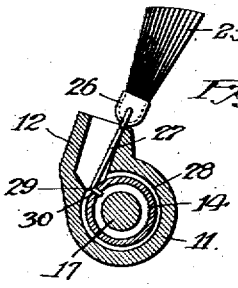
Figure 6 shows the initial step in securing a tuft of bristles in the rotor body of the embodiment shown in Figure 1.

The initial securing of the bristle tuft within the rotor body, see Figure 6, is accomplished by the rotation of the tubular member 14 in the body 11 until the openings 30, 30 therein are immediately below the openings in the brush seats 12, 12 at which time the wires 27, 27 may be inserted through said tuft seats and the bent end 29, 29 thereof secured in said openings. When the respective wires 27, 27 attached to the tufts of bristles have been secured in their respective openings 30, 30 the rotation of the member 14 in the counter-clockwise direction, as viewed in Figure 6, carries the wires into the grooves 28, 28 in the body 11 and presents the disengagement of the ends 29, 29 and the openings 30, 30, as shown in Figure 2.

Referring now to Figures 7 and 8 which disclose a modification of the present invention the agitator or rotor comprises a central tubular member 31 which is provided approximately midway of its length with a large diameter belt-receiving pulley 32. Positioned upon the opposite sides of the pulley 32 are circular flanges, as indicated at 33, for a purpose hereinafter described. Positioned within the member 31 and extending the length thereof is a supporting rod 34 upon which the remainder of the agitator is rotatably mounted. Positioned upon the opposite sides of the pulley 32 and totally enclosing member 31 are cylindrical shells 35, 35 which form the body of the agitator and which are provided with helically extending beater-bar projections 36, 36. Shells 35, 35 are each provided with an interiorly projecting flange 37 at their inner ends which is adapted to seat upon the projecting flange 33 of the pulley 32. Extending inwardly from the inner periphery of the flange 37 of each of the shells 35, 35 are teeth 38 adapted to mesh with teeth 39 carried by the flange 33 of the tubular member 31 and prevent relative rotation therebetween. End plates 40, 40 are secured to the outer ends of each of the body shells 35, 35 and are provided with inwardly extending cylindrical portions as indicated at 41 ending in a shoulder 42. A reduced cylindrical portion 43 extends inwardly from the shoulder 42 into the member 31 and serves to position the end plate 40 and maintain the outer end of the shell 35 in axial alinement with the member. Positioned upon the supporting rod 34 at the respective ends thereof are bearings 44, 44, the outer race of each being carried in the cylindrical portion 41 of an end plate 40. A nut member 45 secured at the extremity of the member 34 compresses a washer 46 against the bearing 44 and retains the bearing 44 in position upon said member. A spring 47 is positioned between the shoulder 42 of the end plate 40 and the bearing 44 which serves at all times to urge the body shell 35, through the end plate 40, in the direction of pulley 32 thereby maintaining flange 37 and the teeth 38 carried thereby in contact with the flange 33 and the teeth 39 positioned thereon. Fixedly carried by member 31 and projecting from each shell 35 of the body through the brush seat or opening formed by the inwardly extending converging walls 48 and 49 are brushes 50, 50 secured by means 51 comprising a screw member which passes through the holder 52 of said brush 50 and into the body 31. The walls 48 and 49 closely approach each other near the member 31 so that the brush is compact, at any particular transverse cross section, as it passes that point. In operation the brush will be flexed as it contacts a surface covering undergoing cleaning, the flexible length obviously being the distance from the narrowest part of the brush seat, as determined by the distance between the walls 48 and 49, to the outer extremity of the brush bristles. The brush should always be so adjusted that it projects to substantially the height of the beater bars 36, 36 above the normal body surface. When so adjusted the effective flexible brush length is always the same, regardless of the position of the brush-adjusting mechanism.

The adjustment of the effective length of a brush 50 is accomplished by the rotation of a shell 35 relative to the main tubular member 31. A slight longitudinal movement of the shell 35 in the direction of the end of the rotor against the action of the spring 47 disengages the coacting teeth 38 and 39 and permits relative rotational movement between itself and member 31. The rotation of the shell 35 in a counter-clockwise direction, as shown in Figure 8, results in the advance of the brush 50 between the walls 48 and 49 and in an increase in the effective height of said brush above the surface of the body. Upon the brush 50 being adjusted to the desired height above the surface of the shell 35 the shell is released. The spring 47 forces said shell inwardly causing the teeth 38 and 39 to again mesh and the rotor is again in operative relation. If it is desired to decrease the effective length of the bristles the shell 35 is rotated in a clockwise direction relative to the member 31 in the manner aforedescribed.

Referring now to Figures 9 and 10 a still further modification of the present invention is disclosed in which the rotor body 53 is rotatably carried by supporting rod 54 by means of bearings 55 at the ends thereof. The rotor body is provided with a pulley 56 near its center and with helically extending beater bars 57 on its surface. Longitudinally extending inwardly projecting converging walls 58 and 59 are formed in the body 53 upon each side of the pulley 56 forming brush seats which are adapted to compress the brush bristles passing therethrough to determine the effective bending length of the brush seated therein. Pivotally mounted within the body upon each side of the pulley by means of a supporting pin 60 is a lever arm 61. The end of lever arm 61 is provided with resilient clamping jaws 62 and 63 which are adapted to receive and retain the back 64 of the sweeping brush 65 and which are so positioned that with the member 64 seated within said jaws the brush 65 is adapted to project between the walls 58 and 59 and beyond the surface of the shell 53. The variation in the effective length of the brush 65 above the surface of the body 53 of the rotor is accomplished through the pivoting of lever arm 61 about the point 60 by means of the internally threaded adjustment member 66 which is connected to the arm 61 at 67 and which is adapted to be advanced and retracted by screw member 68 extending therein. Screw member 68 is rotatably mounted in the shell 53 with its head positioned within a depressed seat 69 in the surface thereof. It is only necessary when it is desired to adjust either brush 65, which must project a distance above the rotor body equal to or slightly greater than the height of beater bars 57 in order to be effective, to turn the screw 68 which is positioned on the same side of the pulley with said brush.

It should also be pointed out that the arrangement of the supporting lever arm 61 and the members 66 and 68 in circumferentially-spaced positions from the brush and its seat in the agitator body serves to provide a better balanced agitator than is the case where both the brush, its seat, and the adjusting means are on the same side of the longitudinal axis. It is further to be noted that the positioning of the brush seat and the brush at an angle to the radius of the agitator makes possible the use of a longer brush resulting in longer life and the ability to provide a greater length of unsupported bristles, a very desirable characteristic particularly when the agitator is of a relatively small diameter.

I claim:

1. In a suction cleaner agitator, a rotatable hollow closed main body, re-entrant walls in said body forming a brush seat, a brush positioned in said brush seat, retaining means for said brush, and means to adjust the position of said retaining means relative to said brush seat comprising a lever arm pivoted in said body and attached to said retaining means, and means operable from the exterior of said body to pivot said lever arm about its pivot point.

2. In a suction cleaner agitator, a rotatable and enclosed main body, re-entrant walls in said main body forming a brush seat, a brush positioned in said brush seat, retaining means for said brush and means to adjust the position of said retaining means relative to said brush seat comprising a lever arm pivoted to said body and attached to said retaining means, an internally threaded member hingedly carried by said pivoted lever and an externally threaded member rotatably mounted in said main body and positioned within said internally threaded member.

3. In a rotary agitator for a suction cleaner, a hollow body, a brush seat formed in said body, a brush in said seat, retaining means for said brush, and means to adjust the position of said retaining means relative to said brush seat, characterized by the fact that a part of said positioning means is spaced circumferentially from said brush and brush seat for the purpose of dynamically balancing said agitator.

4. In a rotary agitator for a hollow suction cleaner, a rotary body, a shaft rotatably supporting said body and extended therethrough, an elongated inwardly extending brush seat in said body, and an elongated brush having a rigid back positioned in said brush seat and extended inwardly to the side of said shaft.

5. In a suction cleaner, a cylindrical revolubly mounted body, a supporting shaft extending through said body, said body having a relatively deep channel formed in its periphery, and a brush mounted in said channel so that a substantial part thereof is located below the periphery of said body to render said brush practically non-fouling, characterized by the fact that said brush lies at an angle to the normal to the surface of said body at the point at which it extends therethrough and extends inwardly to a position at the side of said shaft.

6. In a rotary agitator, an exterior hollow body formed with a brush channel leading from its interior to its exterior, an elongated member positioned in said body, means to secure said body in one of a plurality of angularly spaced circumferential positions relative to said member, a brush connected to the periphery of said member and extended through said channel being adapted to be positioned therein by changes in the relative positions of said body and said member, and means to rotatably support said agitator.

7. In a rotary agitator, an exterior hollow body having a brush channel leading from its interior to its exterior, an interior member within said body adapted to be moved axially and rotated relative to said body, circumferentially extending intermeshing gear teeth on said body and on said member, a brush connected to the exterior of said member and positioned in said channel, and means to resistingly oppose relative axial movement between said body and said member, characterized by the fact that under an axial force said means can be overcome to permit the relative rotation of said body and said member to accomplish the adjustment of the brush in said channel.

8. In a rotary suction cleaner agitator, a body having a brush seat, a brush movably positioned in said brush seat, a central member in said body adapted to be rotated relative thereto, said member being fixedly connected to said brush, and means to prevent unintended movement of said body relative to said member, characterized by the fact that the rotation of said body relative to said member varies the distance from said seat to the point of connection of said brush to said member effecting the adjusting of said brush in said seat.

9. In a suction cleaner agitator, a hollow body formed with a brush seat having inwardly converging side walls, a brush having bristles subject to shortening by wear extended from within said body outwardly through said brush seat and to a point beyond the surface of said body, said seat closely enclosing said brush at its narrowest part and flaring outwardly therefrom to its widest part, said seat thereby fixing the effective length of said brush bristles subject to flexure, and means to adjust said brush relative to said body to compensate for bristle wear.

10. In a suction cleaner agitator, a rotatable closed hollow body formed with a brush seat having inwardly converging side walls, a brush having bristles extended from within said body outwardly through said brush seat and to a point beyond said seat, the walls of said seat enclosing and compactly holding said brush bristles at a point within said body, and means within said body to adjust said brush to force said brush bristles past said point to control the projection of said brush bristles from said seat.

11. In a rotary agitator for a suction cleaner, a rotatable body formed with a brush seat, a brush including flexible bristles positioned in said body, said seat converging on said brush bristles at a point spaced radially within the surface of said body to secure said bristles compactly and being spaced therefrom at the surface of said body to permit free bristle movement, said brush being slidable inwardly or outwardly in said seat.

12. In an agitator for a suction cleaner, a body formed with an elongated brush seat, an elongated brush having bristles extended from a point within said body and from said seat to a point beyond said body, said seat including elongated walls converging into contact with said bristles between their ends and below the surface of said body and determining the effective flexible length of said bristles.

13. In an agitator for a suction cleaner, a rotary cylindrical body, a brush including flexible bristles, and means seating said brush on said body including a seat having a wall spaced circumferentially from said brush at the surface of said body and extended into contact therewith at a point spaced radially within said body, said brush being adapted to be flexed about said point and into contact with said wall in the operation of said agitator.

14. In an agitator for a suction cleaner, a rotary cylindrical body, a brush seat adapted to seat a brush having flexible bristles, said seat including opposed walls circumferentially spaced at the surface of said body which walls converge within said body and then diverge, said walls being adapted to enclose closely the bristles of a brush at their point of convergence.

15. In a rotary agitator for suction cleaners, a rotatably body formed with a substantially radial seat adapted to retain a brush therein having a row of bristle tufts, said seat including side walls having their outer edges spaced circumferentially at the surface of said body and converging radially inward to a slot of predetermined reduced width through which said bristles extend as a compressed mass and from thence to project from said seat relatively free and flexible.

DONALD G. SMELLIE.